No. 637,021. Patented Nov. 14, 1899.
H. E. PARKINSON.
AUTOMATIC AIR BRAKE HOSE COUPLING.
(Application filed Apr. 18, 1899.)
(No Model.)
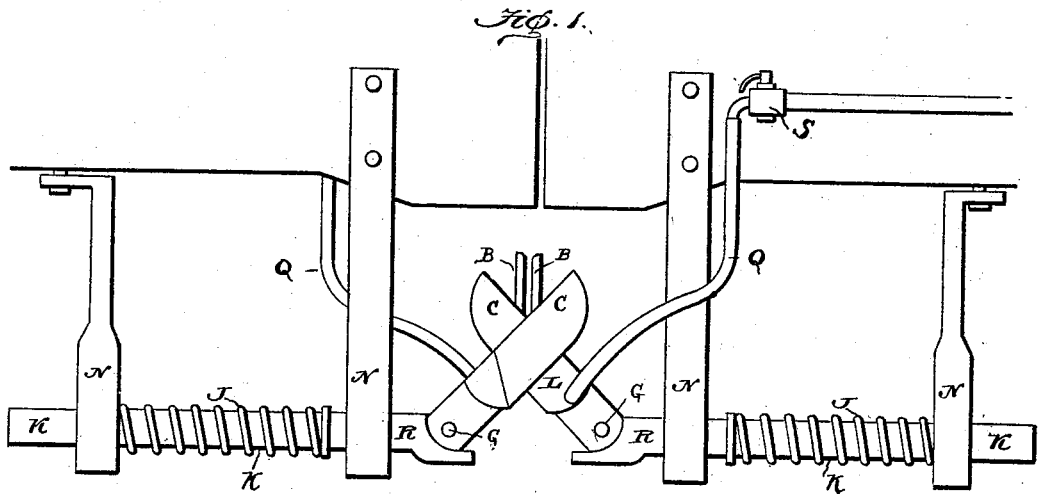
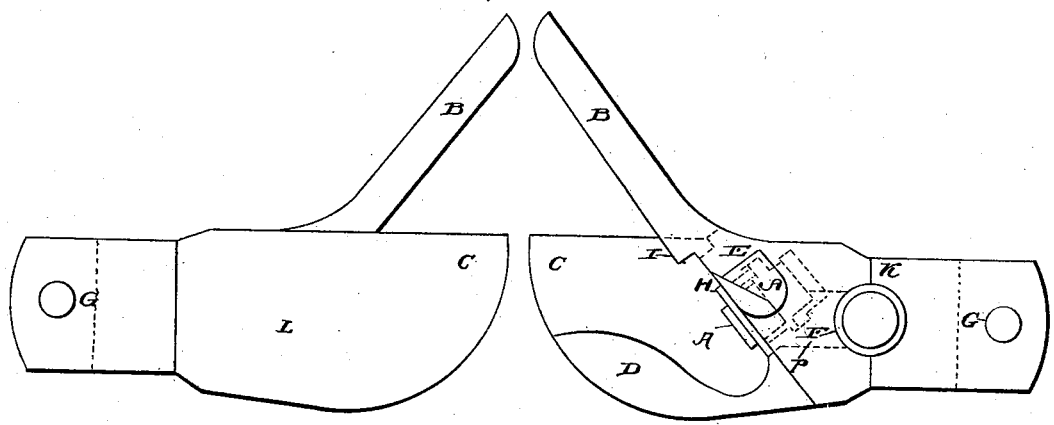
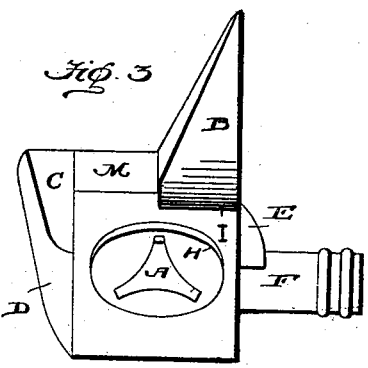
Witnesses
Inventor
Howard Eugene Parkinson.
By David P. Moore,
Attorneys

United States Patent Office.

HOWARD EUGENE PARKINSON, OF SPARTANBURG, SOUTH CAROLINA.

AUTOMATIC AIR-BRAKE HOSE-COUPLING.

SPECIFICATION forming part of Letters Patent No. 637,021, dated November 14, 1899.

Application filed April 18, 1899. Serial No. 713,469. (No model.)

*To all whom it may concern:*

Be it known that I, HOWARD EUGENE PARKINSON, a citizen of the United States, residing at Spartanburg, in the county of Spartanburg and State of South Carolina, have invented a new and useful Automatic Air-Brake Hose-Coupler, of which the following is a description.

My invention relates to improvements in automatic air-brake hose-couplers in which a rigid mechanical joint is made, not depending on any outside force to sustain the pressure on the rubber gaskets that form the joint.

The objects of my invention are the provision of an automatic air-brake hose-coupler which will save both time and labor in coupling and uncoupling, which prevents loss of life, as the parts couple and uncouple automatically, and which is very simple, durable, and cheap in construction, as well as useful and practical in operation. I attain these objects by the mechanism illustrated in the accompanying drawings, in which—

Figure 1 is the coupler complete in position on the cars locked. Fig. 2 is the two pieces of the coupler, exactly alike, but seen from different sides as they would stand before the meeting of the cars. Fig. 3 is a perspective view of one member looking from the front.

Similar letters refer to similar parts throughout the several views.

The coupler is made in two pieces exactly alike, cast of bronze or other suitable metal, and hangs directly under the bumpers of the cars and before coupling stands a few inches beyond them.

Depending from a car-platform are the rods or brackets N, in whose lower ends are slidably mounted the bars K, which have surrounding them each between the rods the coiled spring J, each of which is adapted to hold its bar in place and allow sufficient play, so when the car starts or stops the coupler is not affected. Movably hinged in the outer ends R of these bars by means of the hinge-bolts G are the coupling members or heads L, each of which is formed with the top guides, offsets, or tongues B, the lugs I, the recesses or depressions M, and the side guides or projections C, which are formed with the hooks D, said hooks being adapted to engage the buttons or lugs E upon one side of each member. In the body of each member is the air-channel P, provided with the ring H in its mouth and the nipple or hose-connecting tube F at its entrance end, this nipple being connected with the air-brake hose Q, provided with the cut-off S. In the mouth of each member's air-channel is the valve A. As the cars meet, the top guides B B interlock and hold the coupler in position while it is being forced up to an angle of about forty-five degrees. While the coupler is sliding together and up, the side guides C C cause the buttons E E to pass inside the hooks D D. As the couplers slide up, the hooks and buttons act as a wedge and draw the faces of the rubber rings H H together firmly without friction. The two faces of the coupler coming together open the air-valves A A. The lugs I slide into the corresponding depressions M and keep the two faces from sliding sidewise.

As the car-coupler holds the cars very closely together, allowing very little play, the engagement between the pipe or hose couplers is always tight, although the spring-controlled rods allow the hose-coupler to be pulled farther than the car-coupler can be without becoming disengaged, and escapement of air through the coupler is prevented until the cars are so uncoupled and separated as to pull the hose-couplers apart, when the pivoted heads drop and rest in a plane substantially parallel with the platform of a car.

I claim—

1. The combination with an air-brake hose, of an automatic coupler therefor, comprising two similar members, each consisting of a pivoted head, a contacting tongue or guide carried by said head and adapted to raise the head at an angle and above the connection when contacted, a lug formed upon the same side of the head as the tongue, and means to engage said lug upon the other member and lock the coupler when the head is raised.

2. The combination with an air-brake hose, of an automatic coupler therefor, comprising two similar members, each consisting of a pivoted head, a contacting tongue or guide carried by the head and adapted to raise the head above the connection when contacted, a hook formed upon said head, and means to engage the hook upon the opposite head formed upon the head and adapted to lock the coupler when the heads are raised.

3. The combination with an air-brake hose, of an automatic coupler therefor, comprising two similar members, each consisting of a pivoted or hinged head, a contacting tongue or guide carried by each head adapted to raise said heads when they contact each other, a lug formed at the base and under side of said guide, a hook formed upon said head, said hook and guide providing a recess or depression for the reception of the lug when the members or heads contact, and means to engage the hook upon the opposite head when the heads are raised to lock the coupler.

4. The combination with an air-brake hose, of an automatic coupler therefor, comprising two similar members, each consisting of a pivoted head adapted to lie in line with the platform of a car, a guide or tongue carried by the head adapted to contact a similar guide upon the other head and raise the head upward toward the platform, a hooked projection formed upon the opposite side of the head, and a lug formed upon one side of the head and adapted to fit in the hooked projection of the other member and lock the coupler when the head is raised.

HOWARD EUGENE PARKINSON.

Witnesses:
ROBERT J. GANTT,
JULIAN ESTES.